Dec. 21, 1965 G. H. STRAM 3,224,556
ARTICLE GROUPING AND CONVEYING METHODS AND APPARATUS
Filed Oct. 4, 1962 4 Sheets-Sheet 1
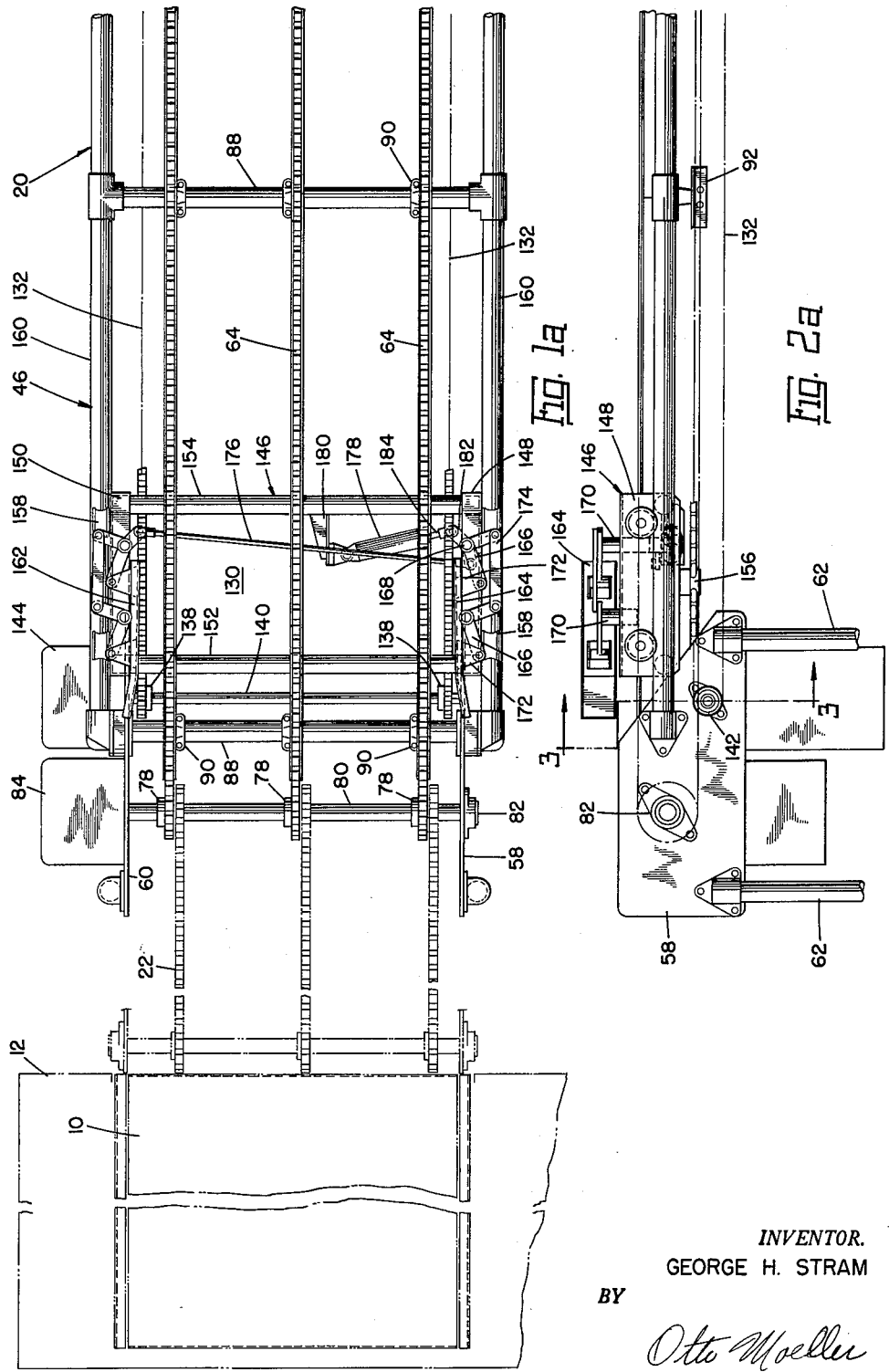
INVENTOR.
GEORGE H. STRAM
BY
Otto Moeller
Attorney

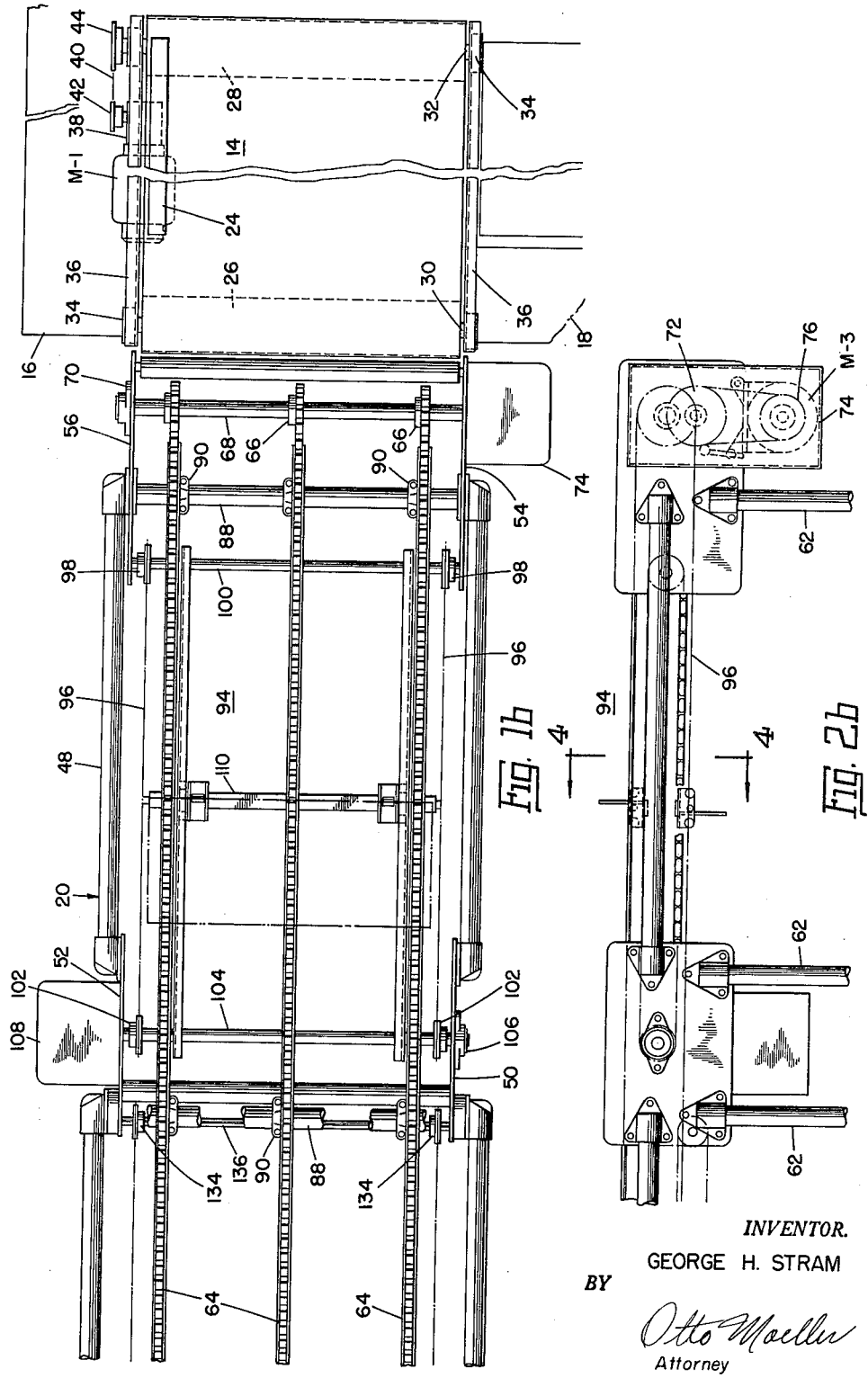

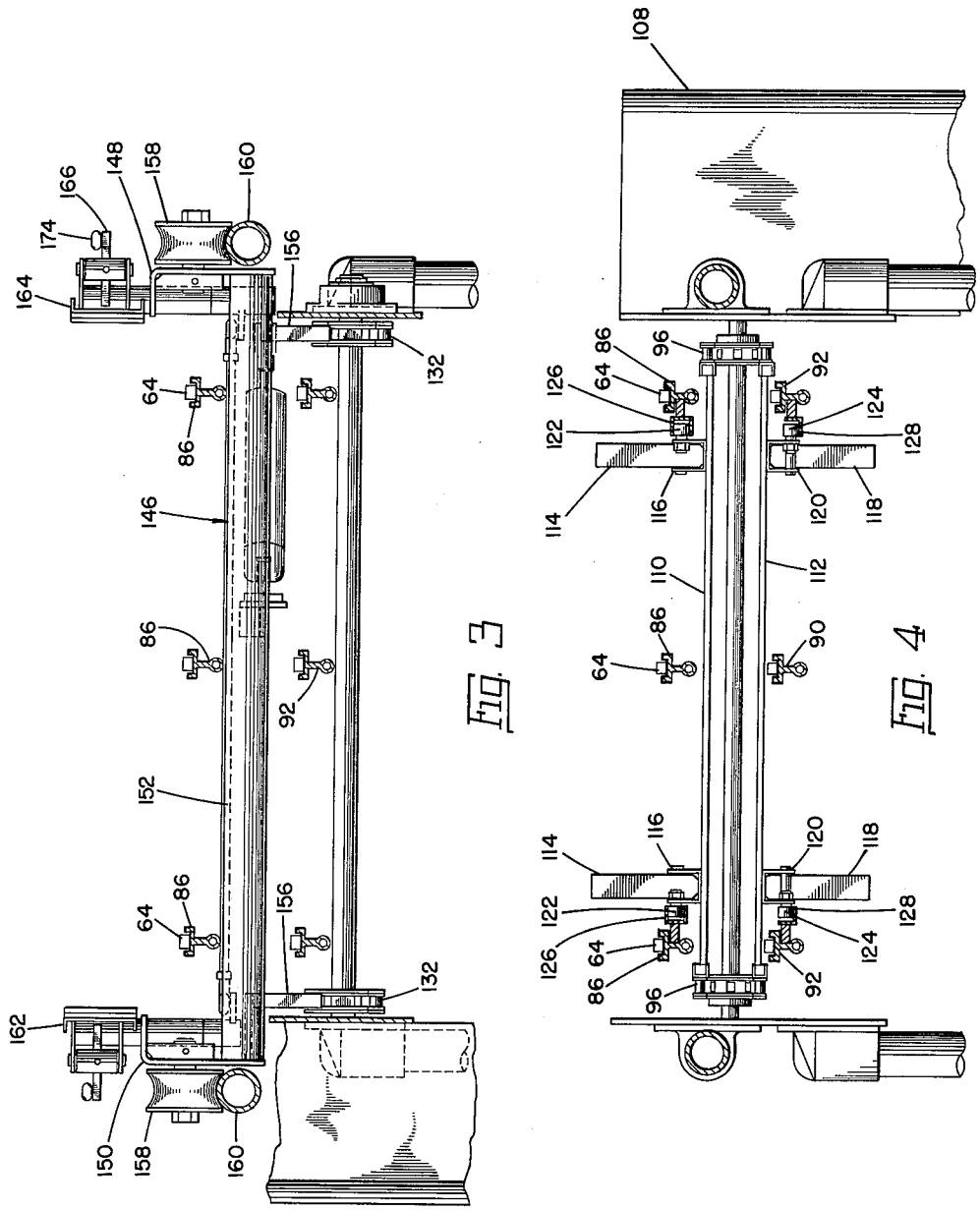
INVENTOR.
GEORGE H. STRAM
BY
Otto Moeller
Attorney

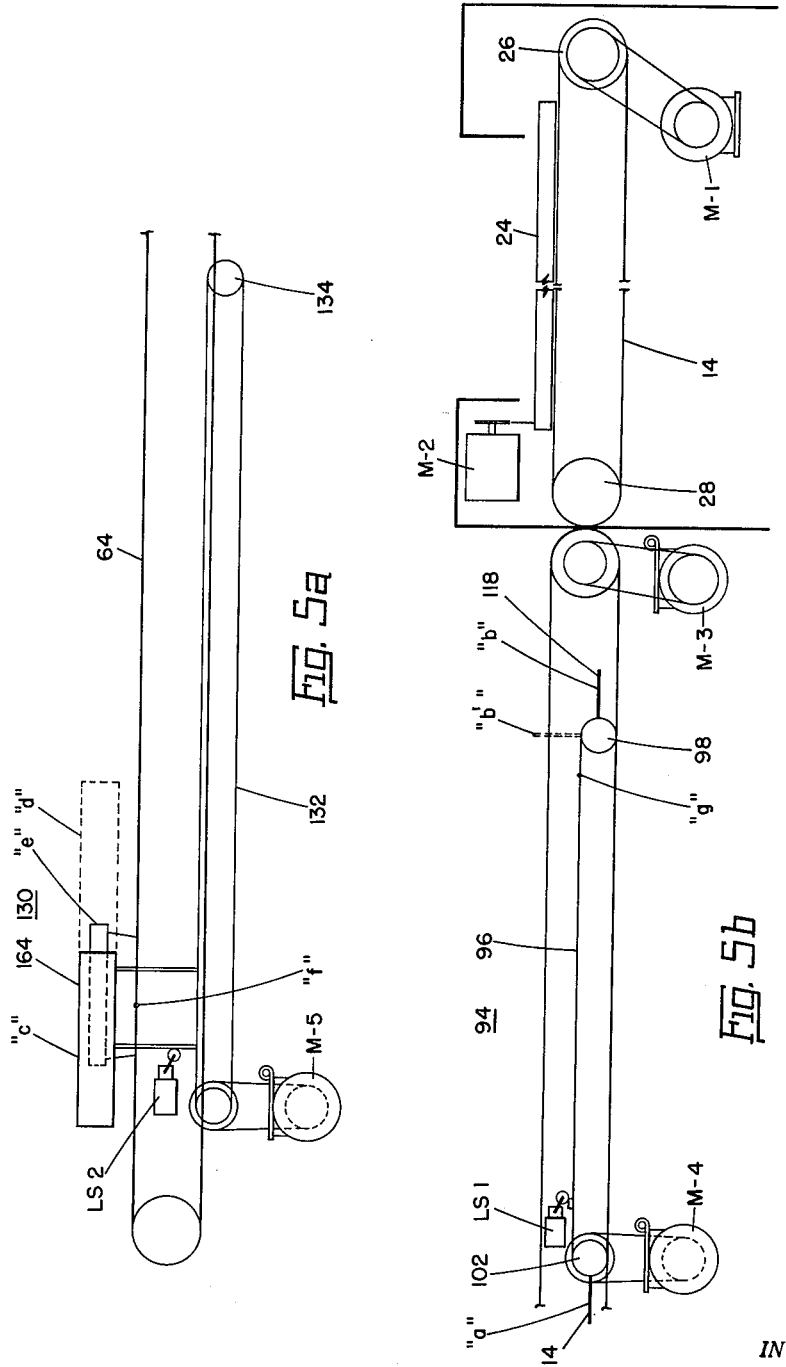

United States Patent Office 3,224,556
Patented Dec. 21, 1965

1

3,224,556
ARTICLE GROUPING AND CONVEYING METHODS AND APPARATUS
George H. Stram, Hellam, Pa., assignor, by mesne assignments, to Baker Perkins Inc., New York, N.Y., a corporation of New York
Filed Oct. 4, 1962, Ser. No. 228,447
14 Claims. (Cl. 198—34)

This invention relates broadly to conveying systems embodying article grouping means and methods and more specifically to conveying systems for releasing groups of articles at regular intervals and spacing the articles in each group.

The invention finds particular utility in the baking industry for handling straps of bread pans in transit from a proofer to an oven, and it is so shown in the drawings and hereinafter described, though it will be apparent that the invention finds application in other fields where it is desirable to group articles and release them in successive spaced groups, and particularly where the articles conveyed require delicate handling.

Considering, for example, the transfer of pan straps of proofed dough from a proofer to an oven in an automated system, such ovens are provided at their loading ends with a transversely extending conveyor adapted for intermittent operation to collect thereon a row of pan straps. When this transversely extending conveyor, generally referred to as the infeed conveyor, has traveled a linear distance to advance a row of pan straps of proofed dough at the loading end of the oven, it stops for a dwell period during which a loading pusher pushes the row of pan straps from the infeed conveyor into the oven. The cycle is repeated to introduce successive rows of pan straps into the oven. A continuously operating endless transfer conveyor delivers the pan straps from the proofer to the receiving end of the oven infeed conveyor, and an important feature of the invention resides in the provision with the transfer conveyor of simple and improved means for intermittently accumulating on the transfer conveyor and releasing to the oven infeed conveyor successive groups of pan sets. A further feature of the invention resides is the provision of novel and improved pan arresting means upstream of and operating in timed relation with the pan accumulating and releasing means for preventing more than the number of pans from being released by the accumulating and releasing means than can be accommodated on the oven conveyor between the ends of the loading pusher.

Another object is to provide novel and improved pan accumulating and releasing means associated with the transfer conveyor, constructed and arranged to soften the impact of the pans against the accumulating means and against each other as they accumulate in a consolidated row behind the accumulating means, which is accomplished by a traveling gate moving in the same direction as, but at a slower speed than, the transfer conveyor, and which is arranged to intermittently release a group of pans to oven infeed conveyor.

Another object is to provide novel and improved pan arresting means associated with the transfer conveyor upstream of the accumulating and releasing means, for minimizing jarring of the pans when arrested, which is accomplished by provision of clamping means moving in the same direction as, but at a slower speed than, the transfer conveyors.

Another object of the invention is to provide a conveying system embodying novel and improved means for automatically delivering successive groups of pans transversely alined at the loading end of the oven, proofer or cooler, as the case may be, in such position in front of

2 and between the ends of a pusher adapted to sweep such successive rows onto successive traveling trays or shelves of the oven, proofer or cooler, so as to prevent fouling or jamming of pans against the side walls or other stationary part of the oven, proofer or cooler during the sweeping stroke of the loading pusher.

A further object is to provide a conveying system embodying pan grouping and, pan accumulating and releasing means for arranging successive groups of pans in the manner set forth above irrespective of whether the pans are delivered by the transfer conveyor in a solid or irregular broken row.

A further object is to provide a conveying system that not only groups pans as described hereinabove, but also spaces the individual pans of successive groups.

Other objects and advantages reside in certain novel feaures of the construction, arrangement and combination of parts which will be hereinafter more fully described, reference being had to the accompanying drawings forming a part of this specification, and in which drawings:

FIGURES 1a and 1b are plan views of the left and right parts of the invention applied respectively to the discharge end of a proofer and the loading end of an oven;

FIGURES 2a and 2b are side elevational views of the conveying system shown in FIGURES 1a and 2b, respectively, the proofer and oven being omitted;

FIGURE 3 is a sectional view taken on irregular line 3—3 of FIGURE 2a;

FIGURE 4 is a sectional view taken on line 4—4 of FIGURE 2b; and

FIGURE 5 is a diagrammatic view of the apparatus shown in side elevation.

Referring to FIGURES 1a and 1b of the drawings, the invention is illustrated therein as embodied in a conveyor system for delivering pans to proofed dough from the endless discharge conveyor 10 of a proofer 12 to the endless loading conveyor 14 of the loading unit 16 of an oven 18, from whence they are pushed in successive transverse rows onto the traveling trays or hearth of an oven in conventional manner well known in the art.

Considering the structure and operation of the conveyor system in a general way, it includes the endless oven loading conveyor 14; a pan accumulating, grouping and releasing conveyor designated as a whole by the reference numeral 20, from which successive groups or ranks of pans are delivered at spaced intervals onto the oven loading conveyor 14; and an endless conveyor or conveyors 22 on which the pans may be haphazardly spaced as they are conveyed thereby from the proofer discharge conveyor 10 to the pan accumulating, grouping and releasing conveyor 20. An intermittently operating reciprocating loading pusher 24 pushes successive groups of pans from the oven loading conveyor 14 onto the trays or hearth of the oven 16.

The oven loading conveyor 14, which may be a belt, slat or other suitable type of endless conveyor, is horizontally disposed adjacent the loading opening of the oven and extends transversely thereof. For purpose of illustration, the oven loading conveyor 14 is shown as a belt trained around guide and driving rollers 26 and 28. The rollers 26 and 28 are carried by shafts 30 and 32, respectively, suitably journaled in bearings 34 supported on side frame members 36 of the loading unit 16. The driving roller 28 is operated from electric motor M–1 through a suitable gear reducer 38 and a sprocket chain 40 trained around sprockets 42 and 44 mounted, respectively, on an extension of driving roller shaft 32 and an output shaft of the gear reducer 38.

The loading pusher 24, as before stated, is arranged for intermittent reciprocating movement, and is cyclically operated in timed relation with the arrival of successive trays of an oven in position to be loaded with a row of pans. The means for cyclically operating the loading pusher motor M-2 in timed relation with the oven is not shown since such means is well known in the art and may be accomplished in various ways, as shown, for example, in Royer Patent No. 2,980,038.

The oven loading conveyor 14 is operated intermittently through a linear travel to bring a row of pans in front of the oven 18 in position to be pushed into the oven by the loading pusher 24. It must then stop for a dwell period while the loading pusher 24 sweeps the pans from the loading conveyor into the oven. It is evident then, that the oven loading conveyor 14 must be operated in timed relation with the loading pusher 24, and the means for accomplishing this is hereinafter described. Also, since the loading pusher 24 operates on a predetermined time cycle controlled by the oven, it is apparent that the loading conveyor must operate at a rate of speed sufficient to bring a full row of pans in front of the loading pusher 24 between its dwell periods in readiness for the next pushing stroke of the loading pusher 24.

The pan accumulating, grouping and releasing conveyor 20 includes any suitable type of supporting framework. As illustrated, the framework includes an upstream rectangular support frame 46 and a downstream rectangular support frame 48, preferably formed of suitable pipe sections and pipe fittings. The adjacent ends of the support frames 46 and 48 are spaced apart and are rigidly connected by a pair of parallel laterally spaced vertical plates 50 and 52. The forward end of the downstream support frame 48 is provided with a similar pair of forwardly projecting plates 54 and 56, the forward ends of which overlap the sides of the receiving end of oven loading conveyor 14. The rearward end of the upstream support frame 46 is provided with a similar pair of rearwardly projecting plates 58 and 60 to which is secured a suitable frame (not shown) for supporting the conveyor 22. Legs, preferably in the form of pipes 62, connected by pipe fittings or other suitable means to the aforementioned plates, support the frames 46 and 48 a desired distance above the floor.

The pan accumulating, grouping and releasing conveyor 20 includes a plurality, three in the present instance, of parallel laterally spaced longitudinally extending endless chains 64 for conveying the pans from the conveyor 22 to the oven loading conveyor 14. The endless chains 64 are trained at their forward ends over sprockets 66 keyed on a transversely extending shaft 68, one end of which is journaled in a bearing 70 carried by the plate 56 and the other end of which extends through the plate 54 and is journaled in a gear reduction unit 72 disposed in a drive housing 74 carried by and depending from the plate 54. Also disposed in drive housing 74 is an electric motor M-3 suitably connected, as by a variable speed pulley drive 76, with the gear reduction unit 72. At their rearward ends, the endless chains 64 are trained over sprockets 78 loosely mounted on a transversely extending shaft 80, one end of which is journaled in a bearing 82 carried by the plate 58 and the other end of which extends through the plate 60 and is adapted to be journaled in a gear reduction unit of a drive means (not shown) disposed in the drive housing 84, which reduction and drive means is preferably the same as that described above in the housing 74 and is adapted to operate the conveyor 22. The upper runs of the endless chains 64 are adapted to ride in upper guide support tracks 86 supported from cross frame members 88 of the support frames 46 and 48 by upwardly projecting portions of the brackets 90. Downwardly projecting portions of the brackets 90 are arranged to support lower guide support tracks 92 for the lower runs of the endless chains 64.

The conveyor chains 64 are operated continuously by the motor M-3, however, means to be described cooperate with the conveyor chains 64 for intermittently releasing successive groups of pans to the oven loading conveyor 14 during the operating cycles of the latter. The downstream support frame 48 of the pan accumulating, grouping and releasing conveyor 20, is provided with a traveling gate conveyor, designated as a whole by the reference numeral 94, for accumulating and releasing successive groups of pans.

The traveling gate conveyor 94 includes a pair of longitudinally elongated endless chains 96 disposed laterally outward of the outer of the three pan conveying chains 64 with their upper and lower runs disposed between the levels of the upper and lower runs of the chains 64. At their forward ends the chains 96 are trained around sprockets 98 rotatably mounted on a transversely extending shaft 100 secured at its ends to rearward extensions of the plates 54 and 56, so that the forward ends of the chains 96 are disposed a distance rearward of the forward ends of the chains 64. At their rearward ends the chains 96 are trained around sprockets 102 keyed on a transversley extending shaft 104, one end of which is journaled in a bearing 106 carried by the plate 50 and the other end of which extends through the plate 52 and is adapted to be journaled in a gear reduction unit of a drive means (not shown) disposed in the drive housing 108, which reduction and drive means is preferably the same as that described above in the housing 74 and is adapted to operate the endless chains 96. The drive means in housing 108 includes an electric motor M-4 which is shown in FIGURE 5a.

A pair of transversely extending gate support bars 110 and 112 are rigidly connected at their opposite ends to the chains 96 and are disposed in diametrically opposite relation with respect to each other. Gates 114 are attached to the gate support bar 110 laterally inward of the outer of the three pan conveying chains 64 by suitable means, as by brackets 116, as best shown in FIGURE 4. In similar manner gates 118 are attached to gate support bar 112 by brackets 120. The gate support brackets 116 and 118 are preferably provided with outwardly projecting rollers 112 and 124, respectively, adapted to ride on upper and lower longitudinally extending tracks 126 and 128 which may be secured in any suitable manner to the tracks 86 and 92. The gates 114 and 116 are adapted to extend upwardly above the plane of the upper run of the pan conveyor chains 64, as the said gates traverse the upper run of the chains 96. Thus, referring to the diagrammatic view, FIGURE 5b, the gates 114 move up from position "a" for travel along the upper run of the chains 96 toward position "b" while the gates 118 move down from position "b" for travel along the lower run of the chains 96 toward position "a."

The traveling gates 114 and 118 are arranged to be cyclically operated with dwell periods at positions "a" and "b" as hereinafter described and are operated in timed relation with the oven loading conveyor 14 as also hereinafter described. The traveling gates 114 and 118 furthermore operate at a slower speed than the pan conveying chains 64, for example, chains 64 may be operating at 38 f.p.m. while the gates may be operating at 19 f.p.m., so that the pans, which as before stated are delivered to the chains 64 in haphazard spaced relation, are adapted to accumulate behind the gates in a consolidated row. The dwell of the gates is a significant feature, since it permits use of a traveling gate conveyor 94 having an overall length that is considerably shorter than the overall length of the group of pans that can be accommodated on the oven loading conveyor 14 between the ends of the loading pusher 24. In other words, when the traveling gates reach the dwell positions "a" and "b," the gate at position "b" releases the group of pans; however, because of the dwell period, the gate at position "a" waits until the last pan of the desired number of pans of a group of pans has passed and then enters a gap, formed in the manner hereinafter explained, between the last pan of the released group of pans and the first pan of a succeeding group of pans. Since the traveling gates 114 and 118 travel at a considerably slower speed than the pan conveying chains 64, the first pan of a group of pans overtakes the traveling gates but the impact of the pan against the traveling gates, which impact is also communicated to successive pans in the group, is substantially less than is the case in prior art pan grouping and releasing means embodying stationary gate means. This is particularly important in the handling of proofed dough, which is sensitive to shock, frequently resulting in collapse of the dough and consequent production of a poor or unsalable loaf of bread. By changing the dwell period, it is apparent that groups of pans of different overall length can be accommodated, providing greater flexibility in operation. The dual gate arrangement, described above, may be employed without the aforementioned dwell periods at positions "a" and "b," but in this event the overall length of the traveling gate conveyor must be increased to equal the overall length of the group of pans to be accommodated on the oven loading conveyor 14 between the ends of the loading pusher 24. Under certain conditions, a single traveling gate may replace the above described dual gate arrangement, if the gate returns from position "b" to position "a" in time to move up into a gap between the last pan of the released group and the first pan of the succeeding group. In this event it may be necessary to employ a two speed drive for the traveling gate conveyor so that the return can be at a faster speed than the forward run in order for the gate to return to position "a" in sufficient time to enter the gap between the released group of pans and the succeeding group.

The gap between successive groups of pans, above referred to, is effected by a traveling clamp means designated as a whole by the reference numeral 130. The traveling clamp means 130 is disposed upstream of the traveling gate conveyor 94 and includes a pair of longitudinally elongated endless chains 132 disposed laterally outward of the outer of the three pan conveying chains 64 and below the plane of the lower run of the chains 64. At their forward ends the chains 132 are trained around sprockets 134 rotatably mounted on a transversely extending shaft 136 secured at its ends to the rearward end portion of the plates 50 and 52. At their rearward ends the chains 132 are trained around sprockets 138 keyed on a transversely extending shaft 140, one end of which is journaled in a bearing 142 carried by the plate 58 and the other end of which extends through the plate 60 and is adapted to be journaled in a gear reduction unit of a drive means (not shown) disposed in the drive housing 144, which reduction and drive means is preferably the same as that described above in the housing 74 and is adapted to operate the endless chains 132. The drive means in housing 144 includes a reversible electric motor M–5 which is shown in FIGURE 5a.

A rectangularly shaped clamp carriage 146 comprising a pair of side plates 148 and 150 connected fore and aft by a pair of transversely extending pipe sections 152 and 154, is adapted to be moved forwardly from its home position adjacent the rearward end of the support frame 46, as shown in FIGURES 1a and 2a, for a short distance and then rearwardly back to its home position in a manner and in timed relation with the operation of the traveling gate conveyor 94, as hereinafter described. Such reciprocatable movement is transmitted to the clamp carriage 146 by the chains 132 to which they are attached by lugs 156 depending from the carriage side plates 148 and 150, the chains 132 in turn being operated from the reversible motor M–5 as previously described. The carriage side plates 148 and 150 are each provided with fore and aft concave outboard rollers 158 adapted to rest on and roll along the pipe sections 160 forming the sides of the support frame 46 to provide rolling fore and aft travel of the clamp carriage 146.

Surmounting the carriage side plates 148 and 150, and supported thereby in a manner to be described, are clamping elements 162 and 164 in the form of parallel vertically disposed longitudinally extending plates, the upstream end portions of which are slightly divergent for guiding pans conveyed by the chains 64 between the clamping elements 162 and 164. The clamping elements are arranged for movement toward and away from each other between pan gripping and pan releasing positions. Referring particularly to the diagrammatic view, FIGURE 5a, the clamping means 130 is arranged to move into clamping position at its upstream or home position "c" and into releasing position at the end of its forward travel, as at downstream position "d." The carriage 146 with its clamping elements 162 and 164 is arranged to travel at a considerably slower speed than the pan conveyor chains 64, for example, with the chains 64 operating at 38 f.p.m., as assumed above, the carriage with its clamping elements may be operated at, for example, 19 f.p.m.

The traveling clamping means 130 serves a twofold purpose, first, it serves to draw the aforementioned gap between successive groups of pans for insertion therein of the gates 114 and 118, and second, since the clamping means 130 moves in the same direction as the pan conveying chains 64 but at a considerably slower speed, jarring of the pans against each other behind the clamped pan, as they form a consolidated group behind the clamping means, is substantially less than in prior construction wherein stationary means is employed to create a gap between successive groups of pans. As above pointed out in the discussion of the traveling gate conveyor 94, this is an important feature when handling products sensitive to shock, such as proofed dough.

The mounting arrangement of the clamping element 164 will now be described in detail, it being understood that the clamping element 162 is similarly mounted. A pair of longitudinally spaced bell cranks 166, each pivotally mounted, as at 168, for pivotal movement in a horizontal plane, in a respective one of a pair of longitudinally spaced bearings 170 secured to the carriage side plate 148. The free end of one arm of each of the bell cranks 166 is pivotally connected to a respective one of a pair of longitudinally spaced lugs 172 secured to the clamping element 164. A link 174 pivotally connects the free ends of the other arms of the bell cranks 166, so that by pivotally moving either of the bell cranks, the two bell cranks 166 move in unison to move the clamping element 164 laterally while maintaining its clamping face in parallelism with the ends of the pans on the conveyor chains 64. A tie rod 176 connects the described linkage with a similar linkage at the opposite side of the clamp carriage 146 for conjoint operation of the clamping elements 162 and 164. The clamping elements 162 and 164 are operated by an air cylinder 178 pivotally secured to a bracket 180 carried by the cross pipe section 154 of the clamp carriage 146. A link 182 operatively connects the free end of the piston rod 184 of the air cylinder 178 with one of the bell cranks 166. Any suitable means, such as a solenoid operated valve, well known in the art and therefore not shown in the drawings, controls admission of air to one end or the other of the air cylinder 178 for moving the clamping elements 162 and 164 between pan retaining and pan releasing position.

Referring particularly to FIGURE 5a, the clamping means 130 is preferably disposed in its upstream position "c" a distance rearward of a traveling gate in release position "b" somewhat greater than the overall length of a consolidated group of pans of the number to be accommodated on the oven loading conveyor 14 between the ends of the loading pusher 24, so that under normal conditions, the first pan of a group will have its forward edge at position "e" when clamped. The operation of the traveling clamp means 130 is synchronized with the operation of the traveling gate means 94, to move into clamping position at its upstream position "c" and to start its travel toward position "d" when a traveling gate reaches pan release position "b'." The significance of this somewhat greater distance "c–b'" than the said overall length of the consolidated group of pans is to insure against the clamping means clamping against the last pan of a group that is being released by the traveling gate means, which can happen due to irregularities in pan width.

It is evident from the above that, when a group of pans is released by the traveling gate at position "b'" to the faster traveling pan conveying chains 64, the succeeding group of pans is held back by the slower traveling clamping means 130, thereby drawing a gap between the first group and the succeeding group of pans. The clamp means 130 need travel only a relatively short distance, less than half the overall length of a consolidated group of pans that can be accommodated on the oven loading conveyor 14 between the ends of the loading pusher 24, as to position "d," to draw the necessary gap between the released group of pans and the succeeding group of pans, so that the clamp means 130 can return to its upstream or home position "c" before the first pan of the next group of pans is in position to be clamped and where it is arranged to dwell in released position until one of the traveling gates again reaches pan release position "b'," whereupon the cycle is repeated. For example, assuming the overall length of the consolidated group of pans to be 94.5 inches, the travel of the clamp means 130 may be approximately 16 inches. The home or upstream position of the traveling clamp means 130 may be longitudinally adjusted so that the first pan of a group may be clamped nearer to or farther from the front edge of the pan. If it happens for some reason, that at one time or another during the course of a run, an insufficient number of pans have backed up behind the traveling gate means 94 to form a full group of consolidated pans between clamp position "c" and gate release position "b'," this merely results in the introduction of less than a full group of pans into the oven.

If desired, the clamping means may be located in its home or upstream position with the forward ends of the clamping elements 162 and 164 rearward of position "c," as at position "f," and the dwell time of the clamp means 130 shortened so that it will start its forward travel when a traveling gate is a similar distance rearward of release position "b'," as at position "g"; and is arranged to move into clamping position when the forward ends of the clamping elements 162 and 164 reach position "c." Under these conditions, when the clamping elements 162 and 164 are traveling at the same rate of speed as the group of pans retained behind the traveling gate, there is a zero differential in speed at the moment of clamping, thereby rendering negligible any jarring of pans at the time of clamping.

In a number of installations it is necessary or desirable that the clamp means 130 be located in its home or upstream position a distance from the traveling gates such that the distance "c–b'," from the forward edge of the clamping elements 162 and 164 in their home position to the release position of the traveling gates is less than the overall length of a consolidated group of pans of the desired number for introduction into the oven. Under such conditions, the dwell time of the clamp means 130 in its home or upstream position is lengthened and the clamping elements 162 and 164 are arranged to move into clamping position during their travel from upstream to downstream position, so that jarring of the pans as they are traveling along the faster moving pan conveying chains 64 and are clamped by the traveling clamp means 130 is considerably reduced. The timing of the dwell period of the clamp means 130 is such, that the clamping elements 162 and 164 reach their clamping position at the appropriate time to clamp the first pan succeeding the last pan of the released group of the desired number of pans to be introduced into the oven.

The oven loading conveyor 14 preferably operates at a somewhat faster speed than the pan conveyor chains 64 so that a space is provided between the individual pans of a group of pans, in which case the overall length of a consolidated group of pans, grouped and released, is appropriately less than the length of the loading pusher 24.

In operation, as previously explained, the loading pusher 24 is operated cyclically in timed relation with the arrival of the oven trays in position to be loaded, as well known in the art. As the loading pusher 24 clears the oven loading conveyor 14 it is arranged to start the oven loading conveyor motor M–1 and also to start a program timer. Such program timers are well known and any suitable type may be employed to effect the desired sequence of events and then inactivate itself until restarted upon reactivation by the loading pusher 24.

Referring to FIGURE 5, when the program timer starts the gates 114 and 118 are operating and gates 118 are at position "b'," so that pans have accumulated behind the same in a consolidated group. At this time the program timer effects operation of the clamping elements 163 and 164 into clamping position by the aforementioned solenoid operated valve air cylinder 178, and also initiates operation of the clamp reversible drive motor M–5. It will be seen that as gates 118 move from position "b'" to position "b," the group of pans preceding the pan clamped by the clamping elements 162 and 164 are released to the faster moving pan conveyor chains 64, so that a gap is drawn between the released group of pans and the first pan of the succeeding clamped group.

Upon release of the group of pans, the program timer initiates operation of oven loading conveyor motor M–1 to move the released group of pans in front of the loading pusher 24. Also upon release of the group of pans, the gates 118, as before stated, move to position "b," at which time gates 114 will be at position "a." On arriving at this position, one or the other of the gates 114 or 118, in the present instance the gates 114, are arranged to engage a limit switch LS–1 to stop the gate operating motor M–4, to provide a dwell period for the gates at position "a" and "b".

The program timer is arranged, when the clamp means 130 reaches position "d," to effect operation of the clamping elements 162 and 164 to release position by the aforementioned solenoid operated valve and air cylinder 178, and also stops and reverses the clamp reversible drive motor M–5. A limit switch LS–2 stops the reversible drive motor M–5 at the upstream or home position "c" of the clamp means 130, where there is a dwell period until the program timer again initiates operation of the clamp means 130 in forward direction and actuates the clamping elements 162 and 164 to clamping position as set forth in a new cycle of events. In the event that it is desired to move the clamping elements 162 and 164 into clamping position after initiation of forward travel of the clamp means 130, the program timer may be modified to provide such sequential operation.

As above described, the operation of the clamping elements 162 and 164 to clamping position draws a gap between the first pan of a group and the preceding group released by the gates, and the program timer is arranged to initiate operation of the gates 114 and 118 from their dwell positions "a" and "b" so that gate will move up into the aforementioned gap when the last pan of the released group has passed gate position "a". The program timer is arranged next to stop the oven loading conveyor motor M-1 when the loading conveyor 14 has operated through the required distance to locate the released group of pans in proper position in front of the loading pusher 24.

A cycle of operation is thereupon completed, which is repeated upon the next operation of the loading pusher 24. While one means has been described for the sequential operation of the various elements of the apparatus, it will be understood that other means may be employed for accomplishing such sequential operation.

I claim:

1. Article grouping means comprising an endless continuously operating article conveyor, traveling gate means movable intermittently along a downstream portion of said continuously operating article conveyor into an upstream article arresting position and a downstream article releasing position, means for initiating movement of said gate means; means for operating said traveling gate means at a slower speed than said continuously operating article conveyor to accumulate haphazardly spaced articles in a consolidated row behind said gate means, clamp means spaced upstream of said traveling gate means movable between article arresting and article releasing position, means mounting said clamp means for movement downstream at a slower speed than the speed of said conveyor, and means for operating said clamp means into article arresting position at predetermined intervals to draw a gap between successive groups of articles for insertion therein of said gate means in its said upstream article arresting position.

2. Article grouping means comprising an endless continuously operating article conveyor, traveling gate means movable along the downstream portion of said continuously operating article conveyor into an upstream article arresting position and a downstream article releasing position, means for operating said traveling gate means at a slower speed than said continuously operating article conveyor to accumulate haphazardly spaced articles in a consolidated row behind said gate means, clamp means spaced upstream of said traveling gate means movable between article arresting and article releasing position, means mounting said clamp means for movement downstream at a slower speed than the speed of said conveyor, and means timing the operation of said clamping means to clamping position with respect to movement of said gate means to article release position to draw a gap between a released consolidated group of a predetermined number of articles and the first article of a succeeding group for insertion therein of said gate means to article arresting position.

3. Article grouping means comprising an endless continuously operating article conveyor, traveling gate means moving along the downstream portion of said continuously operating article conveyor including a pair of gates adapted alternately one to move into article arresting position as the other moves into article releasing position, means for operating said traveling gate means at a slower speed than said continuously operating article conveyor for accumulating haphazardly spaced articles in a consolidated row behind the said one gate as the said one gate moves from its article arresting to its article releasing position, clamp means spaced upstream of said traveling gate means movable between article arresting and article releasing position, means mounting said clamp means for movement downstream at a slower speed than the speed of said conveyor, and means timing the operation of said clamping means to movement of said gate means to draw a gap between a consolidated group of a predetermined number of articles released by said one of said gates and the first article of a succeeding group for insertion therein said other gate to article arresting position.

4. Article grouping means comprising an endless continuously operating article conveyor, traveling gate means disposed along a downstream portion of said continuously operating article conveyor including endless chain means having a pair of diametrically oppositely disposed outwardly projecting gates alternately movable into an upstream article arresting position and a downstream article releasing position, means for operating said traveling gate means at a slower speed than said continuously operating article conveyor to accumulate haphazardly spaced articles in a consolidated row alternately behind each of said pair of gates, clamp means spaced upstream of said traveling gate means movable between article arresting and article releasing position, means mounting said clamp means for movement downstream at a slower speed than the speed of said conveyor, and means for operating said clamp means into article arresting position at predetermined intervals to draw a gap between successive groups of articles for insertion therein of a gate in its upstream article arresting position.

5. Article grouping means comprising an endless continuously operating article conveyor, traveling gate means including endless chain means extending along a downstream portion of and below the article carrying run of said article conveyor and including a pair of diametrically opposed gates attached to said endless chain means adapted at the upstream end of said chain means to move into article arresting position and at the downstream end of said chain means to move into article releasing position, means operating said endless chain means at a slower speed than said article conveyor to accumulate haphazardly spaced articles in a consolidated row behind a gate in article arresting position, clamp means spaced upstream of said traveling gate means movable between article arresting and article releasing position, means mounting said clamp means for movement downstream at a slower speed than the speed of said conveyor, and means operating said clamp means to article arresting position in timed relation with operation of said traveling gate means to draw a gap between a group of articles released by one of said gates for insertion therein of the other of said gates in article arresting position.

6. Article grouping means comprising an endless continuously operating article conveyor, traveling gate means including endless chain means extending along the downstream portion of said article conveyor and having its upper run below the level of the article supporting run of said article conveyor, a motor for operating said endless conveyor at a slower speed than said article conveyor, said traveling gate means including a pair of diametrically opposite gates carried by said endless chain means adapted when traveling along the upper run of said endless chain means to extend above the article supporting run of said article conveyor in article arresting position, means for stopping said motor when said gates are at their upstream and downstream limits of travel below the article supporting run of said article conveyor, control means restarting said motor to move said upstream gate into article arresting position where a predetermined number of articles of a consolidated row have passed the upstream end of said traveling gate means, clamp means spaced upstream of said traveling gate means movable between article arresting and article releasing position, and means operating said clamp means to article arresting position in timed relation with operation of said traveling gate means to draw a gap in said consolidated row of articles for insertion therein of said gate means into article arresting position.

7. Article grouping means comprising an endless continuously operating article conveyor, traveling gate means movable along a downstream portion of said continuously operating article conveyor into an upstream article arresting position and a downstream article releasing position, means for operating said traveling gate means at a slower speed than said continuously operating article conveyor to accumulate articles in a consolidated row behind said gate means, traveling clamp means spaced upstream of said traveling gate means movable between article arresting and article releasing position, means for operating said clamp means into article arresting position at predetermined intervals of time to draw a gap in said consolidated row of articles for insertion therein of said gate means in its upstream article arresting position, and means for moving said clamp means in clamped position in the direction of movement of said article conveyor and at a slower speed.

8. Article grouping means comprising an endless continuously operating article conveyor, traveling gate means movable along a downstream portion of said continuously operating article conveyor into an upstream article arresting position and a downstream article releasing position, means for operating said traveling gate means at a slower speed than said continuously operating article conveyor to accumulate haphazardly spaced articles in a consolidated row behind said gate means, clamp means spaced upstream of said traveling gate means movable between article arresting and article releasing position, means for operating said clamp means into article arresting position at predetermined intervals to draw a gap between successive groups of articles for insertion therein of said gate means in its said upstream article arresting position, a reciprocatable carriage supporting said clamp means movable between an upstream and downstream position arranged to move from said upstream to said downstream position at a slower speed than said continuously operating article conveyor.

9. Article grouping apparatus comprising continuously movable conveyor means for moving articles downstream along a path; clamp means operable to clamp and unclamp an article on said conveyor means; means for moving said clamp means between article clamping and unclamping positions; means mounting said clamp means for movement along said path; and drive means for moving said clamp means downstream along said path at a speed slower than the speed of said conveyor means.

10. Apparatus as set forth in claim 9 wherein said drive means is reversible and cyclically moves said clamp means upstream.

11. A method of grouping articles on a downstream portion of a continuously moving conveyor, said method comprising introducing haphazardly spaced articles to said downstream portion of said conveyor; retarding without stopping the movement of the leading article on said downstream portion while permitting the following articles to continue to move at the speed of said conveyor and accumulate in a group upstream of said leading article; accelerating all of the articles in said group simultaneously and at a uniform rate; and arresting the introduction of additional articles to said downstream portion to provide a space on said conveyor upstream of the trailing article in said group.

12. The method set forth in claim 11 wherein arresting the introduction of said additional articles precedes the acceleration of the group of articles.

13. The method set forth in claim 11 including releasing said additional articles following their arrest for a predetermined period of time.

14. A method of grouping articles on a downstream portion of a continuously moving conveyor, said method comprising introducing haphazardly spaced articles in succession to said downstream portion of said conveyor; retarding without stopping the movement of the leading article on said downstream portion, thereby permitting the following articles to accumulate in a group upstream of said leading article; accelerating all of the articles in said group simultaneously and at a uniform rate; and retarding without stopping the movement of the upstream article immediately adjacent the trailing article in said group to provide a space between said trailing article and said adjacent upstream article.

References Cited by the Examiner

UNITED STATES PATENTS

| 1,872,000 | 8/1932 | Keller | 198—34 X |
| 2,052,840 | 9/1936 | Nussbaum | 198—40 |
| 2,805,755 | 9/1957 | Jones | 198—34 |
| 3,155,221 | 11/1964 | Griner | 198—34 |

FOREIGN PATENTS

| 1,259,525 | 12/1961 | France. |

SAMUEL F. COLEMAN, *Primary Examiner.*

EDWARD A. SROKA, *Examiner.*